(12) United States Patent
Mjelstad et al.

(10) Patent No.: US 6,556,780 B2
(45) Date of Patent: Apr. 29, 2003

(54) HEATED FLOWLINE UMBILICAL

(75) Inventors: Einar Mjelstad, Fredrikstad (NO); Oyvind Iversen, Ski (NO); Torunn Lund Clasen, Halden (NO)

(73) Assignee: Nexans, Paris (FR)

( * ) Notice: Subject to any disclaimer, the term of this patent is extended or adjusted under 35 U.S.C. 154(b) by 0 days.

(21) Appl. No.: 10/026,764

(22) Filed: Dec. 27, 2001

(65) Prior Publication Data

US 2002/0122664 A1 Sep. 5, 2002

(30) Foreign Application Priority Data

Dec. 29, 2000 (NO) ............................ 2000 6704

(51) Int. Cl.$^7$ ................ E03B 7/10; F16L 53/00
(52) U.S. Cl. ............... 392/469; 324/425; 392/465
(58) Field of Search ................... 392/465, 467, 392/471, 472

(56) References Cited

U.S. PATENT DOCUMENTS

| | | | | |
|---|---|---|---|---|
| 202,047 A | * | 4/1878 | Philips | 174/47 |
| 3,526,086 A | * | 9/1970 | Morgan | 138/111 |
| 4,132,884 A | * | 1/1979 | Offermann | 137/341 |
| 4,303,826 A | * | 12/1981 | Ando | 137/341 |
| 5,256,844 A | * | 10/1993 | Grosvik et al. | 138/103 |
| 6,049,657 A | | 4/2000 | Sumner | |
| 6,116,290 A | * | 9/2000 | Ohrn et al. | 138/113 |

FOREIGN PATENT DOCUMENTS

| | | |
|---|---|---|
| NO | 303949 B1 | 9/1998 |
| NO | 984235 | 3/2000 |

* cited by examiner

Primary Examiner—Teresa Walberg
Assistant Examiner—Thor Campbell
(74) Attorney, Agent, or Firm—Sughrue Mion, PLLC

(57) ABSTRACT

The present invention relates to an offshore installation including an oil/gas flowline umbilical installed between a platform—or a shore installation—and a sea bed based template and including an insulated electrical cable conductor connected in series with the steel oil/gas pipe to a power supply. The main features of the invention is that the far end interconnection between the cable conductor (or parallel cable conductors) and the pipe is grounded to seawater to provide a single point grounded system, such that all the current flows in the selected cable conductors, and the system has zero volts at the far end whereby no current is transmitted though the sea. The power supply is insulated from ground and the current is fed from the power supply through the pipe, and returns through the cable, whereby a voltage level of zero Volts is obtained at the far end where the system is grounded, and all the current is forced through the cable(s) and the pipe/flowline.

15 Claims, 2 Drawing Sheets

HEATED FLOWLINE UMBILICAL

TECHNICAL FIELD

The present invention relates to offshore installations including an oil/gas flowline umbilical installed between a platform—or a shore installation—and a sea bed based template/far end and including an insulated electrical conductor connected in series with the steel oil/gas pipe to a power supply.

BACKGROUND

A technical problem with such installations is to provide reliable heating means for preventing/reducing the risk of blocking and/or narrowing oil/gas flowlines when the fluid gets below a critical temperature. A solution to this problem is presented in U.S. Pat. No. 3,975,617. This patent suggests several solutions, one of which makes use of an insulated electrical conductor wound around (and connected in series with) a steel oil pipe. This series connection is terminated at a power supply.

The 'Pipe heating system by AC in steel' disclosed in said US patent depends on skin and proximity effect, hence not requiring any electrical insulation. End-connections and terminations are not described. The document does not give any hint as to whether the system was meant for on- or offshore use. If this system is installed offshore, the sea will make a part of the electric circuit since the sea is very conductive. Hence the return current will be split between the pipe/flowline and the sea, making these as a parallel connection. All the current will therefore not go in the pipe. As described in the patent, there is a skin effect that makes the current go in the outer layer of the conductor. This is however only partly true as this effect depends on both the frequency of the power source and the relative permeability of the conductor. The skin effect is given by the formula:

$$\delta = \sqrt{\frac{2}{\omega \mu \mu_0 \sigma}}$$

where:

$\delta$=Depth of penetration (the smaller the penetration, the larger is the skin effect)

$\omega = 2\pi f$ $f$=The frequency of the current, here 60 Hz $\mu_0$=Permeability of free space: $4 \times \pi \times 10^{-7}$ [Wb/A×m]

$\mu$=Relative permeability $\sigma$=Conductivity.

SUMMARY OF THE INVENTION

For some materials and frequencies, there is no skin effect. Due to the proximity effect, as described in said US patent, the current in the return conductor (which consists of pipe and seawater) will seek to go as close as possible to the conductor which transmits the forward current. As the system described is not electrically insulated, in addition to it being connected to ground at several places using conventional sacrificial anodes (installed for conventional corrosion protection) there is one conductor—i.e. the sea—which is closer to the cable than the pipe. The proximity effect described for the pipe, in the above patent, will also be valid for/in the sea. Hence, most of the part of the current that runs in the sea, will run close to the cable, i.e. the current density will be highest close to the cable for both the pipe and the sea, but the pipe will not be the media which transmits all the current. The pipe transmits between 50 to 70% of the total return current, while the rest is transmitted in the sea. This relationship depends on the pipe material, but mostly on the distance between the cable and pipe. Hence the system as described is not a system which consists of only cable(s) and pipe as the only conductor. If the system were installed onshore, the same current split will occur. Parts of the return current will go in the soil (which conducts relatively well), and parts will go in the pipe.

The main object of the present invention is to present a flowline umbilical which is not based on skin effect technology and which does not require complicated insulation arrangement. A further object of the invention is to avoid use of chemicals for preventing blocking and/or narrowing of the flowline.

The main features of the invention are defined in the accompanying claims. The pipeline is insulated from the platform and grounded at the far end. This new heated flowline umbilical installation shall:

prevent hydrates/wax during shutdowns and be a part of the subsea control system for template (satellite)

maintain a steady state production temperature for the pipeline above critical temperatures for wax and/or hydrate formation during shutdowns; typical temperatures may be 25° C. for hydrate, and 33° C. for wax raise the temperature on pipeline from seabed temperature to required temperature after a shutdown integrate pipeline, control umbilical and a closed direct electric heating system in one bundle.

The closed direct electric heating system within the bundle is using the pipeline as a conductor to perform heating and it is connected—using a cable—to each end of the pipeline. The thermal insulation around the pipeline also serves as electrical insulating material to the voltage applied to the pipeline.

Available power is defined by the client at the offshore facility and required for the heating system is given by temperature requirements. The thermal insulation around the pipeline is designed with a thickness and properties which also allow for electrical insulation. This means that the thermal insulation has a thickness which is adjusted to the available power supply at the offshore facility, and the required temperature in the flowline.

BRIEF DESCRIPTION OF THE DRAWINGS

Above mentioned and other features and objects of the invention will clearly appear from the following detailed description of embodiments of the invention taken in conjunction with the accompanying drawings, where.

DETAILED DESCRIPTION OF THE INVENTION

Figure 1:
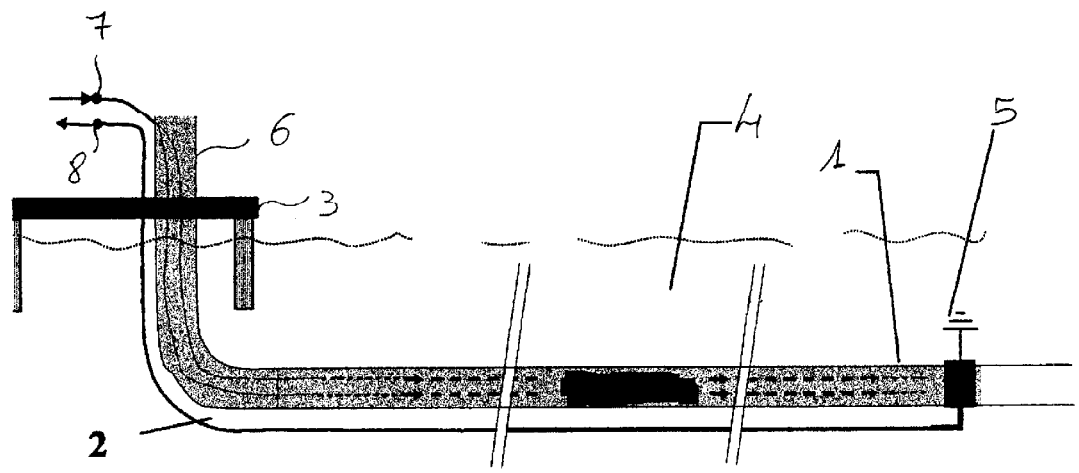
FIG. 1 schematically illustrates an installation layout.

In FIG. 1 is schematically shown a heated flowline umbilical consisting of a pipe 1 and at least one cable conductor 2 leading from an offshore platform 3 to a subsea template (not shown). To provide a single point grounded system, the pipe 1 and the cable conductor 2 are interconnected and grounded to seawater 4 at a point 5. The pipe 1 and cable conductor 2 are completely electrically insulated from surroundings except at the interconnection point 5. The platform end 6 of the pipe 1 is insulated electrically from the platform 3. Cable connectors 7 and 8 from a power supply to the platform end 6 of the pipe 1 and cable conductor 2 are indicated.

Figure 2:
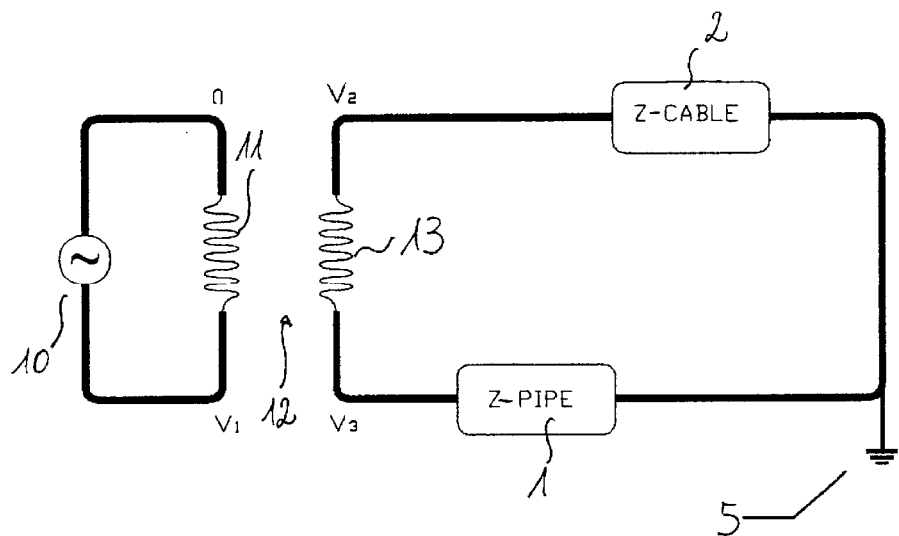
FIG. 2 schematically illustrates platform power supply interconnected with the pipeline and the cable.

FIG. 2 illustrates a power supply 10 on the platform powering a primary winding 11 of a transformer 12. The voltage across the primary winding may be V1 whereas the voltage across the secondary winding 13 may be V3-V2. Due to the difference in the impedance Z-PIPE of the pipe 1 and the impedance Z-CABLE of the cable conductor 2, and the far end grounding 5 of the interconnection between the pipe and the cable conductor 2, the potential across the secondary winding will be V3-V2. By way of example, for a transformer with a ratio of 1:1, V1 may be equal to 100 V. If here is a voltage drop over the cable conductor 2 of 10 V, and 90 V drop along the pipe 1, V2 will be equal to −10 V, and V3=90 V. V3-V2 would then be equal to 100 V. As seen from this example, the single point grounding for this system provides the system with the unique situation of having 0 V at the far end.

Current is fed from the power supply 10 through the pipe 1, and returns through the cable conductor 2. By insulating the power supply from ground, a voltage level of 0 V is obtained at the far end. Hence there is no need for any insulation joint at this end, and no current is transmitted though the sea. The system is also of such a manner that the impedance in the cable conductor 2 vs. the impedance in the pipe 1 is of such a nature that most of the drop in voltage occurs over the pipe 1.

For the system in FIGS. 1 and 2 with a conductor cross section of 120 mm$^2$ and a 2,5" SD pipe (SD stands for 'super duplex' material according to ASTM A789/A789M), the impedance for cable conductor 2, Z-CABLE, is:

Z-CABLE=0,15+j 0,16 [Ω/km]

and the impedance for the pipe, Z-PIPE, is:

Z-PIPE=1,6+j 0,21 [Ω/km]

Figure 3:
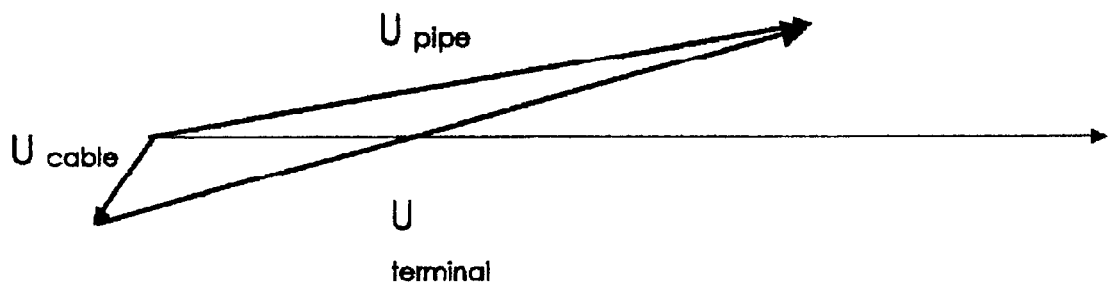
FIG. 3 shows a voltage vector diagram, and FIG. 4 schematically illustrates a cross section of the heated flowline umbilical according to the invention.

As seen from the results in Table 2, the voltage drop related to the pipe 1 is approximately 10 times the voltage drop of the cable conductor 2, as illustrated in the vector diagram in FIG. 3.

Table 1 discloses the system impedance and "impedance" related to the cable and pipe is defined as the ratio between the voltage drop and the current. The power requirements and terminal voltage to keep the risers 20° C. above ambient temperature are shown in Table 2 for a riser length of 12 km.

Figure 4:
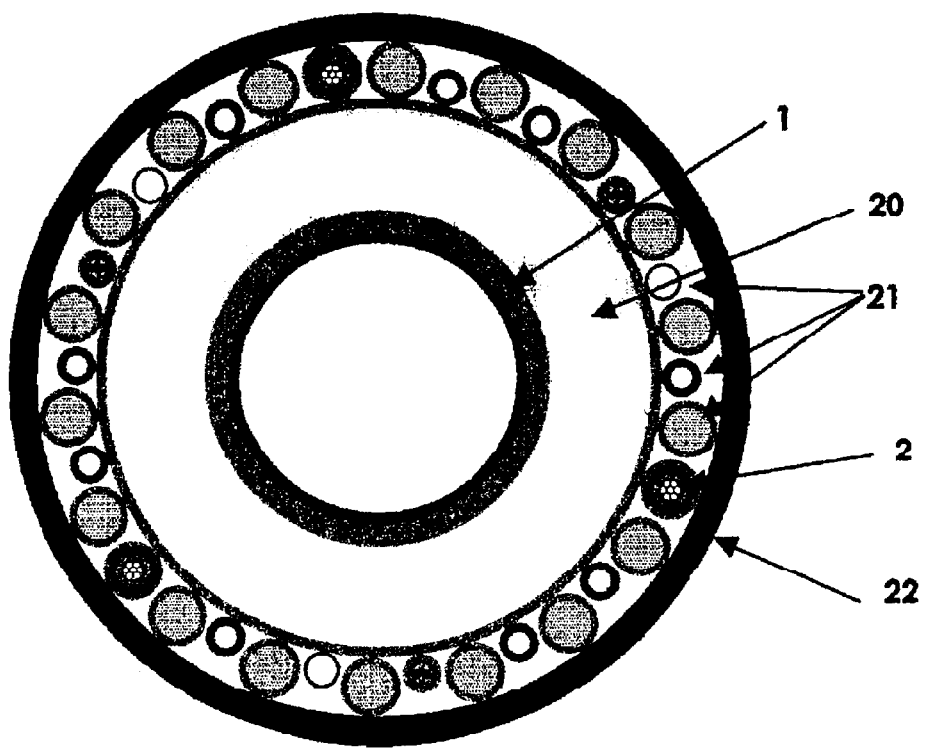

In FIG. 4 is illustrated a cross section of an umbilical according to the present invention. The following components are shown:

a pipeline 2"-8" (SD/Carbon steel) 1, a thermal/electrical insulation 20, low and high pressure lines, chemical lines, electrical power and signal elements, fiber optic elements 21, power cable(s) 2 of closed system outer serving 22.

The space between the elongated elements are normally filled so that a uniform bending behaviour is achieved. The umbilical is not necessarily perfectly circular.

The number of return cables may be more than one. For example there may exist some restrictions to the available outer diameter of the Heated Flowline Umbilical, and the required cable cross sectional area required for transmitting the required current is too large to achieve this outer diameter. If this is the case, one cable conductor may be replaced with 2 or more cable conductors which conduct the current in parallel. These cable conductors with a smaller cross section area, and outer diameter, will then contribute in reducing this diameter The cable cross section may be 50, 70, 95, 120 mm$^2$, or others. The cross sectional area depends on how much current is needed to be transmitted. Filling elements may be made of rope. With respect to insulation that may be appropriate, polypropylene—that is extruded onto the pipe—has shown to provide promising electrical properties. Wrapped polypropylene cannot be used due to insufficient electrical properties.

A transformer 12 (see FIG. 2) has to be installed at the platform 3. The power supply 10 includes a transformer 12 having a primary side 11 and a secondary side 13 where the secondary side is insulated from any other conductive media than the two terminals and is interconnected with the single point grounded interconnection between the pipe 1 and the cable conductor 2. The power supply 10 may also include a load and phase compensating equipment for compensating a 1-phase load to a 3-phase supply, and for compensating the reactive load.

The elements are laid-up around the pipeline 1 including a complete termination in each end. The elements may be spirally stranded, laid SZ-wise or applied in parallel with the pipe axis.

The outer serving 22 could be pressure extruded or tube extruded. The solutions cover all dynamic and static configurations. The basic idea is to provide a single point grounded system.

The new flowline heating system includes a power supply which is insulated from ground. Current is fed from the power supply 10 through the pipe 1, and returns through the cable conductor 2. The subsea interconnection between the pipe/flowline 1 and the cable conductor/cable 2 is grounded, thereby obtaining a voltage level of zero volts at the far end. Hence there is no need for any insulation joint at this end, and no current is transmitted through the sea. The system is also such that the impedance in the cable conductor 2 versus the impedance of the pipe 1 is such that most of the drop in voltage occurs over the pipe 1.

The advantage(s) of the new solution as compared with the best prior art solution(s) referred to, is that an extremely complicated subsea insulation arrangement is avoided due to the single point grounding of the system. The system of the invention also has better thermal properties than many known systems and hence less power is required than for comparable flowlines The above detailed description of embodiments of the present invention should not be taken as limitations in the scope of protection. The dimensions of pipeline in the umbilical may be 2"-8" (and above if practical). When used for offshore facilities the voltage could be up to 15 kV and above, depending of insulation material on pipeline. It may be used for subsea satellites located up to 12 km (and above if practical) from host platform.

The umbilical according to the invention can be used for carrying any kind of fluids, as well gaseous fluids as liquid fluids.

TABLE 1

| Pipe dimension | 2.5" | 4.5" | 6" | 8" |
|---|---|---|---|---|
| Z-CABLE [Ω/km] Super duplex | 0.15 + j 0.16 | 0.15 + j 0.19 | — | — |
| Z-CABLE [Ω/km] Carbon steel | 0.15 + j 0.16 | 0.15 + j 0.19 | 0.078 + j 0.20 | 0.049 + j 0.22 |
| Z-PIPE [Ω/km] Super duplex | 0.93 + j 1.0 | 0.53 + j 0.57 | — | — |
| Z-PIPE [Ω/km] Carbon steel | 1.6 + j 0.21 | 0.68 + j 0.22 | 0.42 + j 0.46 | 0.32 + j 0.35 |
| System Impedance [Ω/km] Super duplex | 1.7 + j 0.37 | 0.83 + j 0.38 | — | — |
| System Impedance [Ω/km], pipe with carbon steel | 1.1 + j 1.2 | 0.69 + j 0.76 | 0.5 + j 0.66 | 0.37 + j 0.56 |
| Z-PIPE/Z-CABLE Super duplex | 7.4 | 3.3 | — | — |
| Z-PIPE/Z-CABLE Carbon steel | 6.2 | 3.3 | 2.9 | 2.1 |
| Conductor cross section [mm$^2$] (SD and carbon) | 120 | 120 | 240 | 400 |

TABLE 2

| Riser dimension | Conductor cross section [mm$^2$] | System current [A] | Voltage [V] | Apparent power [kVA] | Power consumption [kW] |
|---|---|---|---|---|---|
| 2.5" super duplex | 120 | 160 | 3400 | 540 | 530 |
| 2.5" carbon steel | 120 | 208 | 3900 | 820 | 560 |
| 4.5" carbon steel | 120 | 345 | 4250 | 1500 | 990 |
| 6" carbon steel | 240 | 421 | 4200 | 1800 | 1100 |
| 8" carbon steel | 400 | 560 | 4500 | 2500 | 1400 |

What is claimed is:

1. Offshore installation including a flowline umbilical installed between a platform and a sea bed based template called far end, and including at least one insulated electrical cable conductor connected in series with a pipe for carrying fluids to a power supply, characterized in that the far end interconnection between said at least one cable conductor and said pipe is grounded to seawater to provide a single point grounded system, such that all the current flows in said at least one cable conductor, and substantially no current is transmitted through the sea, and the system has zero volts at said far end.

2. Installation according to claim 1, characterized in that said power supply is insulated from ground and the current is fed from said power supply through said pipe which is electrically insulated, and returns through said at least one cable conductor, whereby a voltage level of 0 V is obtained at said far end where the system is grounded, and substantially all the current is forced through said at least one cable conductor and said pipe.

3. Installation according to claim 1, characterized in that the impedance of said cable conductor vs. The impedance of said pipe is such that most of the drop in voltage occurs over said pipe.

4. Installation according to claim 1, characterized in that said flowline umbilical comprises a center steel tube for forming said pipe and at least one layer of external concentric insulation material around said pipe, as well as a number of elongated elements including at least one power cable conductor located around said insulation layer, and outer protective servings.

5. Installation according to claim 1, characterized in that a first power supply terminal is electrically connected to the platform end of said pipe, a second power supply terminal is electrically connected to the platform end of said at least one cable conductor, and the far end of said pipe is electrically interconnected with the far end of said at least one cable conductor at said template in order to provide a closed loop system.

6. Installation according to claim 1, characterized in that said power supply is arranged to provide single phase AC current up to 7,5 kV and above.

7. Installation according to claim 1, characterized in that said power supply is dimensioned for heating an umbilical having a tube diameter up to 8" and above.

8. Installation according to claim 1, characterized in that said power supply includes a transformer having a primary side and a secondary side where the secondary side is insulated from any other conductive media than the two terminals and is interconnected with the single point grounded interconnection between said pipe and said at least one cable conductor.

9. Installation according to claim 8, characterized in that said power supply also includes a load and phase compensating equipment for compensating a 1-phase load to a 3-phase supply, and for compensating the reactive load.

10. A flowline umbilical installed between a first location and a second location at a far end from the first location, the second location disposed in a body of water, the flowline umbilical comprising:

an insulated electrical cable conductor;

a pipe carrying fluids;

wherein the pipe is connected in series with the insulated electrical cable conductor at the second location, and wherein the pipe and the insulated cable conductor share a common ground to the body of water at the second location to form a single point grounded system.

11. The flowline according to claim 10, wherein substantially all the current flows in the insulated cable conductor, substantially no current is transmitted through the body of water, and a voltage at the second location is substantially zero.

12. The flowline according to claim 10, wherein the first location is an offshore installation.

13. The flowline according to claim 12, wherein the offshore installation has a power supply that is insulated from the ground at the offshore installation.

14. The flowline according to claim 13, wherein the power supply feeds current through the pipe.

15. The flowline according to claim 10, wherein the pipe is insulated from its surrounding underwater except at the common ground.

* * * * *